United States Patent
Li et al.

(10) Patent No.: US 12,221,874 B2
(45) Date of Patent: Feb. 11, 2025

(54) METHOD FOR INCREASING PRODUCTION AND INJECTION OF RESERVOIR COUPLED WITH FLUE GAS DESULFURIZATION AND DENITRIFICATION

(71) Applicants: CHINA UNIVERSITY OF PETROLEUM, Qingdao (CN); CHINA SHI DA EDUCATION DEVELOPMENT CO., LTD., Qingdao (CN)

(72) Inventors: Binglin Li, Qingdao (CN); Yuliang Su, Qingdao (CN); Binfei Li, Qingdao (CN); Chao Zhang, Qingdao (CN); Shouya Wu, Qingdao (CN); Dongxia Li, Qingdao (CN); Wendong Wang, Qingdao (CN); Lei Li, Qingdao (CN); Yongmao Hao, Qingdao (CN)

(73) Assignees: CHINA UNIVERSITY OF PETROLEUM, Qingdao (CN); CHINA SHI DA EDUCATION DEVELOPMENT CO., LTD., Qingdao (CN)

(*) Notice: Subject to any disclaimer, the term of this patent is extended or adjusted under 35 U.S.C. 154(b) by 0 days.

(21) Appl. No.: 17/997,106

(22) PCT Filed: Mar. 17, 2022

(86) PCT No.: PCT/CN2022/081516
§ 371 (c)(1),
(2) Date: Oct. 25, 2022

(87) PCT Pub. No.: WO2022/237320
PCT Pub. Date: Nov. 17, 2022

(65) Prior Publication Data
US 2024/0401456 A1    Dec. 5, 2024

(30) Foreign Application Priority Data

May 8, 2021  (CN) .......................... 202110501599.7

(51) Int. Cl.
*E21B 43/27*    (2006.01)
*B01D 53/60*    (2006.01)
(Continued)

(52) U.S. Cl.
CPC .............. *E21B 43/27* (2020.05); *B01D 53/60* (2013.01); *B01D 53/78* (2013.01);
(Continued)

(58) Field of Classification Search
CPC .... B01D 53/502; B01D 53/501; B01D 53/78; B01D 2258/0283; E21B 43/16; E21B 43/27
See application file for complete search history.

(56) References Cited

U.S. PATENT DOCUMENTS 9,255,220 B2 *  2/2016  Falana ...................... C09K 8/42
11,154,813 B2 * 10/2021  Constantz ................. C02F 9/20

OTHER PUBLICATIONS

English translation of CN 108559480. (Year: 2018).*

* cited by examiner

*Primary Examiner* — Zakiya W Bates
(74) *Attorney, Agent, or Firm* — CBM PATENT CONSULTING, LLC

(57) ABSTRACT

The last sentence of the abstract has been deleted because it refers to purported merits of the invention. The abstract should not refer to purported merits or speculative applications of the invention and should not compare the invention with the prior art, therefore the abstract has been amended to delete the last sentence by Examiner's amendment.

12 Claims, 1 Drawing Sheet

(51) Int. Cl.
    *B01D 53/78*     (2006.01)
    *E21B 41/00*     (2006.01)
(52) U.S. Cl.
    CPC .... *E21B 41/0057* (2013.01); *B01D 2251/104* (2013.01); *B01D 2251/106* (2013.01); *B01D 2257/302* (2013.01); *B01D 2257/404* (2013.01); *B01D 2258/0283* (2013.01)

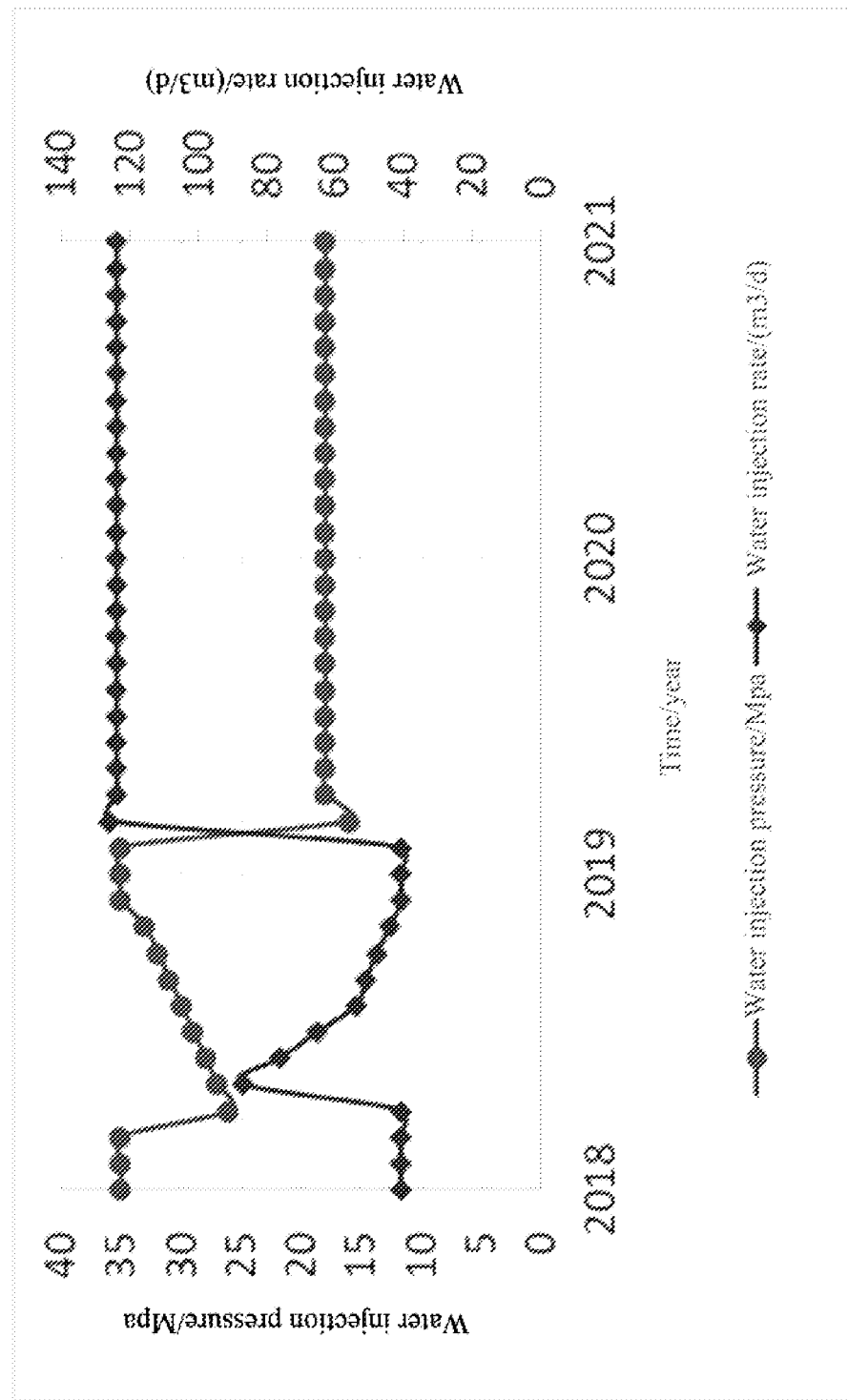

METHOD FOR INCREASING PRODUCTION AND INJECTION OF RESERVOIR COUPLED WITH FLUE GAS DESULFURIZATION AND DENITRIFICATION

FIELD OF THE INVENTION

The present disclosure relates to the technical field of flue gas cleaning and carbonate reservoir acidizing reconstruction, and in particular, to a method for increasing production and injection of a reservoir coupled with flue gas desulfurization and denitrification.

BACKGROUND OF THE INVENTION

Flue gas contains polluting gases such as $NO_x$, $SO_x$. In order to control atmospheric pollution, desulfurization and denitrification are needed. The important factors affecting the economic efficiency of desulfurization and denitrification technology are operation cost and utilization of flue gas constituents. For desulfurization and denitrification products, the existing technologies mostly adopt the methods of discharge, accumulation and storage, which are easy to cause secondary pollution such as water eutrophication, so utilization ways of the released nitrate and sulfur need to be studied. Chinese patent document CN102671529A uses the desulfurization and denitrification product for chemical fertilizers and chemical raw materials through $NH_3$ and apatite desulfurization and denitrification.

Acid fracturing is the most commonly used stimulation treatment in oil-water well stimulation, especially in carbonate reservoirs. There are several problems in traditional acid fracturing, including strong acid liquor filtration, fast reaction rate of acid rock, short acting distance, and low efficiency of removing blockages. While nitric acid powdered acidizing process combines nitric acid with a curing agent, solving the above-mentioned problems by using characteristics of nitric acid solid powder, such as weak corrosiveness and easy injection, which make the nitric acid powdered acidizing process technology plays a greater effect in oil field stimulation, but the process has disadvantages of short acting distance and strong corrosiveness owing to high cost, complicated operation, and weak alkalinity of traditional curing agents such as urea.

Traditional desulfurizing and denitrating agents mainly include urea, ethanolamine, ammonia, or the SCR method, but do not consider the use of multidentate ligands such as Tetrahydroxyethyl Ethylenediamine (THEED) and 2,2'-Bipyridine (bipy). Therefore, it cannot chelate with $Ca^{2+}$, $Mg^{2+}$ and $Fe^{3+}$ to increase production and injection by using traditional desulfurization and denitrification products, and corrosion inhibitors such as additives are needed, which is difficult to increase the rate of $Ca^{2+}$ and $Mg^{2+}$ escaping from the rock surface. The desulfurizing and denitrating agent used in the present disclosure has a strong alkalinity, a chelating effect, a relatively slow hydrolysis, and a relatively long acting distance of acid liquor.

SUMMARY OF THE INVENTION

In view of deficiencies of the prior art, the present disclosure proposes a method for increasing production and injection of a reservoir coupled with flue gas desulfurization and denitrification, that is, a desulfurizing and denitrating agent and an oxidizing agent are used as curing agents, and the waste liquor of desulfurization and denitrification are enriched as an acid liquor, which can not only better control environmental pollution, but also serve several purposes, reducing the acidizing cost of a carbonate reservoir, achieving deep acidizing and increase of production and injection of an oil-water well, and solving the following problems of the prior art: Firstly, although the existing desulfurization and denitrification processes can control atmospheric pollution, desulfurization and denitrification products can not be effectively used, and it is easy to cause secondary pollution such as water eutrophication. Secondly, there are several problems in traditional acid fracturing, including strong acid liquor filtration, fast reaction rate of acid rock, short acting distance, and low efficiency of removing blockages. Thirdly, the existing powdered acid still has strong corrosiveness owing to high cost, complicated operation and weak alkalinity of curing agents.

The present disclosure is the first to apply flue gas desulfurization and denitrification products to reservoir acidizing and stimulation, in which $NO_x$ and $SO_x$ in the flue gas react with a desulfurizing and denitrating agent to generate corresponding nitrates and sulfates, the generated waste liquor is directly injected into an oil-water well as an acid liquor, reservoir temperature enables the nitrates and sulfates in the waste liquor to be slowly hydrolyzed to generate $H_2SO_4$ and $HNO_3$, and the generated acid reacts with the reservoir to achieve effects of acidizing, and increase of production and injection. At the same time, the desulfurizing and denitrating agent coordinate with $Ca^{2+}$, $Mg^{2+}$ and $Fe^{3+}$ to achieve corrosion inhibition and iron ion stability in pipelines, promote hydrolysis of nitrates and sulfates in the reservoir, and prevent precipitation of calcium and magnesium ions.

In order to achieve the above objects, the present disclosure adopts the following technical solutions:
  a method for increasing production and injection of a reservoir coupled with flue gas desulfurization and denitrification includes flue gas desulfurization and denitrification process and reservoir acid liquor acidizing process:
(1) Flue Gas Desulfurization and Denitrification Process:
  method I: a desulfurizing and denitrating agent is uniformly mixed with $H_2O_2$ solution to prepare a solution, and the solution is sprayed into a flue gas in an opposite direction of flue gas flow, and when the pH of the solution system reaches 6 to 6.5, the waste liquor generated by desulfurization and denitrification is collected, which is the acid liquor.
  Method II: $O_3$ is mixed into a flue gas in an opposite direction of flue gas flow, and simultaneously a desulfurizing and denitrating agent is sprayed into the flue gas, and when the pH of the solution system reaches 6 to 6.5, the waste liquor generated by desulfurization and denitrification is collected, which is the acid liquor.
  Preferably, the $H_2O_2$ solution has a mass fraction of 10% to 25%, and more preferably 20%.
  Preferably, the desulfurizing and denitrating agent is THEED or bipy solution with a mass fraction of 0.010% to 0.025%, preferably THEED solution with 0.020% or bipy solution with 0.020%.
  Preferably, a volume ratio of THEED solution with a mass fraction of 0.015% to $H_2O_2$ solution with a mass fraction of 15% is 100:1 to 200:1, preferably 75:1.
  Preferably, a volume ratio of bipy solution with a mass fraction of 0.015% to the $H_2O_2$ solution with a mass fraction of 15% is 100:1 to 200:1, preferably 400:3.
  Preferably, a volume ratio of THEED or bipy with a mass fraction of 0.015% to $O_3$ is 200:3 to 400:3, preferably 100:1.
  Preferably, the pH of the solution system is 6.5.

Chemical reaction equations in method I of step (1) are:

$$2NO_x + (5-2x)H_2O_2 + bipy = [H_2bipy]^{2+} + 2NO_3^- + (4-2x)H_2O \quad (1)$$

$$SO_x + (3-x)H_2O_2 + THEED = [H_2THEED]^{2+} + SO_4^{2-} + (2-x)H_2O \quad (2)$$

Chemical reaction equations in method II of step (1) are:

$$2NO_x + (5-2x)O_3 + THEED + H_2O = $$
$$[H_2THEED]^{2+} + 2NO_3^- + (5-2x)O_2 \quad (3)$$

$$SO_x + (3-x)O_3 + bipy + H_2O = [H_2bipy]^{2+} + SO_4^{2-} + (3-x)O_2 \quad (4)$$

The reaction products are represented by $[H_2bipy]^{2+}$ or $[H_2THEED]^{2+}$.

(2) Reservoir Acid Liquor Acidizing Process:

the acid liquor in step (1) is directly injected into a carbonate reservoir for acidizing reconstruction and increase of production and injection of the reservoir.

Preferably, the acid liquor constituents are nitrates and sulfates of THEED or bipy, and more preferably, the acid liquor contains about 0.015% $[H_2bipy]^{2+}$ or $[H_2THEED]^{2+}$.

Preferably, the acid injection rate of flow is 0.5 to 5.0 m³/h.

Chemical reaction equations in step (2) are:

$$CaCO_3 + [H_2bipy]^{2+} = [Cabipy]^{2+} + CO_2\uparrow + H_2O \quad (5)$$

$$MgCO_3 + [H_2THEED]^{2+} = [MgTHEED]^{2+} + CO_2\uparrow + H_2O \quad (6)$$

The curing agent can chelate with $Ca^{2+}$ and $Mg^{2+}$ to generate $[Cabipy]^{2+}$ and $[MgTHEED]^{2+}$, which can promote hydrolysis reaction of the acid liquor, and further expand the range of increasing production and injection, and prevent the formation of precipitates such as carbonate and sulfate.

The present disclosure also includes an acid liquor for increasing production and injection of a reservoir, the acid liquor includes a nitrate or sulfate of a desulfurizing and denitrating agent.

Preferably, the acid liquor may be prepared by the above-described method for increasing production and injection of a reservoir coupled with flue gas desulfurization and denitrification.

Further preferably, the acid liquor contains a nitrate of the desulfurizing and denitrating agent with a mass fraction of 0.002% to 0.004% and a sulfate of the desulfurizing and denitrating agent with a mass fraction of 0.016% to 0.018%.

The present disclosure also includes the application of the acid liquors to acidizing reconstruction of a carbonate reservoir. Nitrates and sulfates containing a desulfurizing and denitrating agent are converted into nitric acid and sulfuric acid at a higher reservoir temperature, and the nitric acid and sulfuric acid can react with carbonate to achieve the effect of acidizing reservoir to increase production and injection thereof. At the same time, the desulfurizing and denitrating agent coordinate with $Ca^{2+}$, $Mg^{2+}$ and $Fe^{3+}$ to achieve corrosion inhibition and iron ion stability in pipelines, promote hydrolysis of nitrates and sulfates in the reservoir, and prevent precipitation of calcium and magnesium ions.

One or more technical solutions provided by examples of the present disclosure shall have at least the following technical effects:

(1) In the present disclosure, for the first time, flue gas desulfurization and denitrification products are used for reservoir acidizing reconstruction, which can not only control atmospheric pollution and improve the economic efficiency of flue gas treatment, but also reduce the cost of reservoir reconstruction and prepare acid liquor cheaply.

(2) The acid liquor obtained by the present disclosure has a very weak acidity and has substantially no corrosion effect on a pipeline, and a desulfurizing and denitrating agent, namely, a curing agent, can be better adsorbed on the pipe wall to achieve corrosion inhibition.

(3) The curing agent used in the present disclosure has a strong alkalinity, a slow hydrolysis of acid liquor, and a relatively long acting distance, and after the hydrolysis, organic and inorganic blockages can be removed simultaneously through actions of acid etching, oxidation, nitration and sulfonation.

(4) The curing agent used in the present disclosure can coordinate with metal ions, and can play an anti-precipitation and anti-sludge function, and accelerate the diffusion of $Ca^{2+}$ and $Mg^{2+}$ ions from solid surface into the acid liquor, where the generated complex ions are positively charged and adsorbed on negatively charged reservoir surface, and at the same time, the curing agent functions as an anti-swelling agent and a sacrificial agent to prevent oil-displacing agent from remaining in the reservoir during later production.

BRIEF DESCRIPTION OF THE DRAWINGS

FIG. 1 is a graph showing variation of water injection pressure and water injection rate in C-2 water injection well of the S oil field of Application Example 2 from 2018 to 2021.

DETAILED DESCRIPTION OF THE EMBODIMENTS

The present disclosure will be explained in details with reference to the following specific examples, but is not limited thereto.

It should be noted that the experimental methods described in the following examples are traditional methods unless otherwise specified. And the reagents, materials and equipment are commercially available unless otherwise specified.

Example 1

A method for increasing production and injection of a reservoir coupled with flue gas desulfurization and denitrification includes the following steps:

(1) Flue gas desulfurization and denitrification process: THEED with a mass fraction of 0.015% is added into $H_2O_2$ solution with a mass fraction of 15% to prepare a mixed solution, with a volume ratio of 75:1, and the mixed solution is sprayed into a flue gas in an opposite direction of flue gas flow, and when the pH of the system reaches 6.5, the waste liquor generated by desulfurization and denitrification is collected, which is the acid liquor.

(2) The obtained acid liquor, with about 0.015% $[H_2THEED]^{2+}$, may be directly injected into a formation to increase production and injection, and dissolution rate and corrosion rate of acid liquor are tested according to SY/T 5358-2002 Reservoir Sensitive Flow Test Method. The operation steps for testing the dissolution rate and corrosion rate of cuttings in different acid systems are as follows:

5 g of cuttings are respectively placed into test tubes containing 500 mL acid liquor, and then the test tubes are placed into a 90° C. water bath to fully react for 120 minutes and filter, so as to obtain the dissolution rate of cuttings. The hanging piece is descaled, degreased, dried, weighed, and immersed into the acid liquor using hanging piece weight loss method, and after 120 minutes, the hanging piece is fished out, the residual acid is washed, dried and weighed, and the corrosion rate is obtained. The results are shown in Table 1.

Example 2

A method for increasing production and injection of a reservoir coupled with flue gas desulfurization and denitrification includes the following steps:
(1) Flue gas desulfurization and denitrification process: bipy with a mass fraction of 0.015% is added into $H_2O_2$ solution with a mass fraction of 15% to prepare a mixed solution, with a volume ratio of 400:3, and the mixed solution is sprayed into a flue gas in an opposite direction of flue gas flow, and when the pH of the system reaches 6.5, the waste liquor generated by desulfurization and denitrification is collected, which is the acid liquor.
(2) The obtained acid liquor, with about 0.015% $[H_2bipy]^{2+}$, may be directly injected into a formation to increase production and injection, and dissolution rate and corrosion rate of the acid liquor are tested according to the method of Example 1. The results are shown in Table 1.

Example 3

A method for increasing production and injection of a reservoir coupled with flue gas desulfurization and denitrification includes the following steps:
(1) Flue gas desulfurization and denitrification process: $O_3$ is mixed into a flue gas in an opposite direction of flue gas flow, and 0.015% THEED is sprayed at the same time, with a volume ratio of THEED to $O_3$ being 100:1, and when the pH of the solution reaches 6.5, the waste liquor generated by desulfurization and denitrification is collected, which is the acid liquor.
(2) The obtained acid liquor, with about 0.015% $[H_2THEED]^{2+}$, may be directly injected into a formation to increase production and injection, and dissolution rate and corrosion rate of the acid liquor are tested according to the method of Example 1. The results are shown in Table 1.

Example 4

A method for increasing production and injection of a reservoir coupled with flue gas desulfurization and denitrification includes the following steps:
(1) Flue gas desulfurization and denitrification process: $O_3$ is mixed into a flue gas in an opposite direction of flue gas flow, and bipy with a mass fraction of 0.015% is sprayed at the same time, with a volume ratio of $O_3$ to bipy being 1:100, and when the pH of the solution reaches 6.5, the waste liquor generated by desulfurization and denitrification is collected, which is the acid liquor.
(2) The obtained acid liquor, with about 0.015% $[H_2bipy]^{2+}$, may be directly injected into a formation to increase production and injection, and dissolution rate and corrosion rate of the acid liquor are tested according to the method of Example 1. The results are shown in Table 1.

Comparative Example 1

The dissolution rate and corrosion rate of hydrochloric acid with a mass fraction of 15% are tested according to the method of Example 1, and the results are shown in Table 1.

Comparative Example 2

The dissolution rate and corrosion rate of traditional nitric acid powdered acid containing urea nitrate (with a mass fraction of 15%) are tested according to the method of Example 1, and the results are shown in Table 1.

TABLE 1

Dissolution rate and corrosion rate of cuttings in different acid liquor systems

| Acid liquor system | Dissolution rate/% | Corrosion rate/% |
| --- | --- | --- |
| Comparative Example 1 | 11.05 | 0.75 |
| Comparative Example 2 | 22.03 | 1.18 |
| Example 1 | 40.50 | 0.64 |
| Example 2 | 30.07 | 0.59 |
| Example 3 | 40.70 | 0.65 |
| Example 4 | 30.09 | 0.60 |

It can be seen from Table 1 that in Example 1, THEED is used to replace a traditional curing agent, whose dissolution rate is 2 times higher than that of the above-mentioned traditional powdered nitric acid and nearly 4 times higher than that of HCl, and whose corrosion rate is 55% of that of traditional powdered nitric acid and 87% of that of HCl. In Example 2, bipy is used to replace a traditional curing agent, whose dissolution rate is 1.5 times higher than that of traditional powdered nitric acid and nearly 3 times higher than that of HCl, and whose corrosion rate is 50% of that of traditional powdered nitric acid and 80% of that of HCl. In Example 3, THEED is used to replace a traditional curing agent, whose dissolution rate is 2 times higher than that of traditional powdered nitric acid and nearly 4 times higher than that of HCl, and whose corrosion rate is 55% of that of traditional powdered nitric acid and 87% of that of HCl. In Example 4, bipy is used to replace a traditional curing agent, whose dissolution rate is 1.5 times higher than that of traditional powdered nitric acid and nearly 3 times higher than that of HCl, and whose corrosion rate is 50% of that of traditional powdered nitric acid and 80% of that of HCl.

The acid liquor according to the present disclosure is better than traditional powdered acids in increase of production and injection and corrosion inhibition properties: THEED is used to replace a traditional curing agent, because it has a strong alkalinity and a longer acting distance of acid liquor, and is easily coordinated with $Ca^{2+}$ and $Mg^{2+}$ than bipy, showing a better performance of increasing production and injection. Bipy is used as a curing agent, because it is easily coordinated with $Fe^{3+}$ and adsorbed on pipeline surface, showing a better corrosion inhibition performance.

Example 5

Different concentrations of THEED curing agent are used to desulfurize and denitrify flue gas of the same mass, where oxidation system is $H_2O_2$ solution (with a mass fraction of 15%), and $NO_x$ and $SO_x$ have a concentration of 0.8% and 1.6% respectively. The waste liquor of desulfurization and denitrification process is directly used as acid liquor, and then the dissolution rate and corrosion rate of rock cuttings are evaluated by the method of Example 1. The results are shown in Table 2. As can be seen, curing agent concentration is preferably 0.020%. Although corrosion inhibition performance increases with the increase of curing agent concentration, when the curing agent concentration is 0.025%, the solution has weak acidity and poor performance of increasing production and injection, so the optimal curing agent concentration is 0.020%.

TABLE 2

Dissolution rate and corrosion rate of acid liquors prepared by different THEED concentrations on cuttings

| Curing agent concentration/% | Dissolution rate/% | Corrosion rate/% |
|---|---|---|
| 0.010 | 38.23 | 0.68 |
| 0.015 | 40.50 | 0.64 |
| 0.020 | 41.02 | 0.59 |
| 0.025 | 38.66 | 0.54 |

Example 6

Different concentrations of bipy curing agent are used to desulfurize and denitrify flue gas of the same mass in Example 5, where oxidation system is $H_2O_2$ solution (with a mass fraction of 15%), and $NO_x$ and $SO_x$ have a concentration of 0.8% and 1.6% respectively. The waste liquor of desulfurization and denitrification process is directly used as acid liquor, and then the dissolution rate and corrosion rate of rock cuttings are evaluated by the method of Example 1. The results are shown in Table 3. As can be seen, curing agent concentration is preferably 0.020%. Although corrosion inhibition performance increases with the increase of curing agent concentration, when the curing agent concentration is 0.025%, the solution has weak acidity and poor performance of increasing production and injection, so the optimal curing agent concentration is 0.020%.

TABLE 3

Dissolution rate and corrosion rate of acid liquors prepared by different bipy concentrations on cuttings

| Curing agent concentration/% | Dissolution rate/% | Corrosion rate/% |
|---|---|---|
| 0.010 | 28.14 | 0.66 |
| 0.015 | 30.07 | 0.59 |
| 0.020 | 36.52 | 0.56 |
| 0.025 | 33.64 | 0.51 |

Application Example 1

In 2020, $H_2O_2$ and bipy curing agent were successfully applied to flue gas desulfurization and denitrification in P thermal power plant of T oil field, which had been using the SCR method for desulfurization and denitrification before. Now different volume ratios of $H_2O_2$ and bipy are prepared as curing agent to make the flue gas pass through the curing agent. Desulfurization and denitrification efficiency is obtained by determining concentrations of $NO_x$ and $SO_x$ before and after the flue gas passing through the curing agent through gas chromatography, as shown in Table 4, and mass fractions of sulfate and nitrate in waste liquor of desulfurization and denitrification are determined through liquid chromatography. It can be seen that desulfurization and denitrification efficiency of the curing agent is higher than that of the SCR method, and water eutrophication is treated. The volume ratio of bipy to $H_2O_2$ is preferably 400:3, at which the waste liquor contains a nitrate of the desulfurizing and denitrating agent with a mass fraction of 0.004% and a sulfate of the desulfurizing and denitrating agent with a mass fraction of 0.018%. When the volume ratio is relatively low, $NO_x$ cannot be oxidized sufficiently, and is difficult to continue to react with bipy. When the volume ratio is relatively high, the generated $H_2SO_4$ and $HNO_3$ are not completely neutralized, so the desulfurization and denitrification efficiency is low.

TABLE 4

Desulfurization and denitrification efficiency of curing agents prepared with different volume ratios of $H_2O_2$ to bipy

| Methods | | Desulfurization efficiency/% | Denitrification efficiency/% |
|---|---|---|---|
| SCR method | | 79.09 | 75.50 |
| V(bipy):V($H_2O_2$) | 50:1 | 80.03 | 76.65 |
| in the present | 100:1 | 88.33 | 86.45 |
| disclosure | 400:3 | 97.50 | 96.04 |
| | 200:1 | 93.58 | 92.84 |

Application Example 2

In 2019, $H_2O_2$ and THEED curing agent were successfully applied to flue gas desulfurization and denitrification in P thermal power plant of T oil field, which had been using the SCR method for desulfurization and denitrification before. Now different volume ratios of $H_2O_2$ and THEED are prepared as curing agent to make the flue gas pass through the curing agent. Desulfurization and denitrification efficiency is obtained by determining concentrations of $NO_x$ and $SO_x$ before and after the flue gas passing through the curing agent through gas chromatography, as shown in Table 5. The waste liquor produced by desulfurization and denitrification is collected, mass fractions of sulfate and nitrate of which are determined through liquid chromatography. It can be seen that the desulfurization and denitrification efficiency of THEED is higher than that of the SCR method and bipy due to its strong alkalinity, and water eutrophication is treated. The volume ratio of THEED to $H_2O_2$ is preferably 75:1, at which the waste liquor contains a nitrate of the desulfurizing and denitrating agent with a mass fraction of 0.002% and a sulfate of the desulfurizing and denitrating agent with a mass fraction of 0.016%.

TABLE 5

Desulfurization and denitrification efficiency of curing agents prepared with different volume ratios of $H_2O_2$ to THEED

| Methods | | Desulfurization efficiency/% | Denitrification efficiency/% |
|---|---|---|---|
| SCR method | | 79.09 | 75.50 |
| V(THEED):V($H_2O_2$) | 50:1 | 80.54 | 77.56 |
| in the present | 75:1 | 99.00 | 98.00 |
| disclosure | 100:1 | 91.23 | 89.85 |
| | 200:1 | 95.51 | 94.34 |

Application Example 3

On Mar. 8, 2018, powdered nitric acid (the main constituent is urea nitrate with a mass fraction of 15%) was used for acidizing and stimulation of C-2 injection well of the S oil field. After the construction, the water injection pressure dropped to 26 MPa, and the daily water injection rate rose to 87 m³/d, but the water injection pressure increased to 35 MPa after 210 days. On Feb. 3, 2019, the water injection pressure was 35 MPa and the daily water injection rate was 41 m³/d before the construction, and the waste liquor produced in the desulfurization and denitrification process of Example 2 was used for acidizing and stimulation with acid injection rate of flow being 5 m³/h. And the water injection pressure was 18 MPa after the construction and the daily water injection rate was 124 m³/d, as shown in FIG. 1, which is effective until now.

What is claimed is:

1. A method for increasing production and injection of a carbonate reservoir coupled with flue gas desulfurization and denitrification, characterized in that:
   a desulfurizing and denitrating agent is mixed uniformly with $H_2O_2$ solution to prepare a solution, and the solution is sprayed into a flue gas in an opposite direction of flue gas flow to obtain a waste liquor; or $O_3$ is mixed into the flue gas in the opposite direction of flue gas flow, and simultaneously the desulfurizing and denitrating agent is sprayed into the flue gas to obtain the waste liquor;
   when the pH of the solution system reaches 6 to 6.5, the waste liquor is collected as an acid liquor and injected into a reservoir to increase production and injection thereof;
   the desulfurizing and denitrating agent comprises Tetrahydroxyethyl Ethylenediamine (THEED) or 2,2'-Bipyridine (bipy) solution with a mass fraction of 0.010% to 0.025%.

2. The method for increasing production and injection of a carbonate reservoir coupled with flue gas desulfurization and denitrification according to claim 1, characterized in that the desulfurizing and denitrating agent is THEED solution with a mass fraction of 0.020% or bipy solution with a mass fraction of 0.020%.

3. The method for increasing production and injection of a carbonate reservoir coupled with flue gas desulfurization and denitrification according to claim 1, characterized in that the $H_2O_2$ solution has a mass fraction of 10% to 25%.

4. The method for increasing production and injection of a carbonate reservoir coupled with flue gas desulfurization and denitrification according to claim 3, characterized in that the $H_2O_2$ solution has a mass fraction of 15%.

5. The method for increasing production and injection of a carbonate reservoir coupled with flue gas desulfurization and denitrification according to claim 1, characterized in that a volume ratio of THEED solution with a mass fraction of 0.015% to $H_2O_2$ solution with a mass fraction of 15% is 100:1 to 200:1; a volume ratio of bipy solution with a mass fraction of 0.015% to the $H_2O_2$ solution with a mass fraction of 15% is 100:1 to 200:1; and a volume ratio of THEED or bipy with a mass fraction of 0.015% to $O_3$ is 200:3 to 400:3.

6. The method for increasing production and injection of a carbonate reservoir coupled with flue gas desulfurization and denitrification according to claim 5, characterized in that a volume ratio of the bipy solution with a mass fraction of 0.015% to the $H_2O_2$ solution with a mass fraction of 15% is 400:3.

7. The method for increasing production and injection of a carbonate reservoir coupled with flue gas desulfurization and denitrification according to claim 5, characterized in that a volume ratio of the THEED or bipy with a mass fraction of 0.015% to the $O_3$ is 100:1.

8. The method for increasing production and injection of a carbonate reservoir coupled with flue gas desulfurization and denitrification according to claim 1, characterized in that a volume ratio of the THEED solution with a mass fraction of 0.015% to $H_2O_2$ solution with a mass fraction of 15% is 75:1.

9. The method for increasing production and injection of a carbonate reservoir coupled with flue gas desulfurization and denitrification according to claim 1, characterized in that chemical reaction equations of the flue gas desulfurization and denitrification are:

$$2NO_x + (5-2x)H_2O_2 + bipy = [H_2bipy]^{2+} + 2NO_3^- + (4-2x)H_2O \quad (1)$$

$$SO_x + (3-x)H_2O_2 + THEED = [H_2THEED]^{2+} + SO_4^{2-} + (2-x)H_2O \quad (2)$$

$$2NO_x + (5-2x)O_3 + THEED + H_2O = \quad (3)$$
$$[H_2THEED]^{2+} + 2NO_3^- + (5-2x)O_2$$

$$SO_x + (3-x)O_3 + bipy + H_2O = [H_2bipy]^{2+} + SO_4^{2-} + (3-x)O_2. \quad (4)$$

10. The method for increasing production and injection of a carbonate reservoir coupled with flue gas desulfurization and denitrification according to claim 1, characterized in that chemical equations of the acid liquor being injected into the reservoir to increase production and injection thereof are:

$$CaCO_3 + [H_2bipy]^{2+} = [Cabipy]^{2+} + CO_2\uparrow + H_2O \quad (5)$$

$$MgCO_3 + [H_2THEED]^{2+} = [MgTHEED]^{2+} + CO_2\uparrow + H_2O. \quad (6)$$

11. The method for increasing production and injection of a carbonate reservoir coupled with flue gas desulfurization and denitrification according to claim 1, characterized in that acid injection rate of flow of the acid liquor into the reservoir is (0.5 to 5.0) m³/h.

12. The method for increasing production and injection of a carbonate reservoir coupled with flue gas desulfurization and denitrification according to claim 1, characterized in that the acid liquor contains a nitrate of the desulfurizing and denitrating agent with a mass fraction of 0.002% to 0.004% and a sulfate of the desulfurizing and denitrating agent with a mass fraction of 0.016% to 0.018%.

* * * * *